United States Patent [19]

Randall

[11] 4,268,011
[45] May 19, 1981

[54] STUD TENSIONER FOR BLOWOUT PREVENTER

[75] Inventor: Ross D. Randall, Houston, Tex.

[73] Assignee: Cameron Iron Works, Inc., Houston, Tex.

[21] Appl. No.: 51,427

[22] Filed: Jun. 22, 1979

[51] Int. Cl.³ .............................................. E21B 19/00
[52] U.S. Cl. .................................. 254/29 A; 81/57.38
[58] Field of Search ........................ 81/57.38; 254/29 A

[56] References Cited

U.S. PATENT DOCUMENTS 3,015,975  1/1962  Biach ................................. 81/57.38

FOREIGN PATENT DOCUMENTS 1390012  4/1975  United Kingdom ............. 81/57.38
 541661  3/1977  U.S.S.R. ........................... 81/57.38

Primary Examiner—James L. Jones, Jr.
Attorney, Agent, or Firm—Vinson & Elkins

[57] ABSTRACT

An apparatus for tensioning bonnet studs of a blowout preventer, said apparatus having a body with a pair of recesses and a piston positioned in each recess, each of the pistons having a piston rod extending from the body with a stud and nut receiving recess at the outer end of each piston rod, a pair of tension rods having internal threads at their outer ends of engagement with bonnet studs, means for providing engagement between the body and the tension rods, a passage through the body to the body recesses for application of a pressure fluid to the pistons, the pistons and the tension rods being positioned on the body so that when the piston rods are positioned over two opposite bonnet studs the tension rods engage two other opposite bonnet studs.

2 Claims, 6 Drawing Figures

STUD TENSIONER FOR BLOWOUT PREVENTER

BACKGROUND

The bonnets of ram type blowout preventers are generally secured to the preventer body with fasteners such as bolts or studs and nuts. To facilitate ram changes, the number of fasteners used has been minimized. With increased working pressures both fastener diameter and length increase to accommodate the increased pressure and the resultant increased bonnet thickness. The use of torque to tension bonnet bolting is not reliable since the torque-stress relationship for such fasteners varies substantially and with larger fasteners the torques recommended exceed the capacity of commonly available wrenching equipment.

Bolt tensioning equipment is available for use on pressure vessels, on large anchor bolts and other applications but such equipment is not well adapted for tensioning blowout preventer bonnet studs.

The J. L. Biach U.S. Pat. No. 3,015,975 and the R. E. Latham U.S. Pat. No. 4,075,923 each disclose a stud tensioning apparatus using a pressure responsive member to place the stud under tension. Biach provides a bevel gearing system to set the nut once the stud is under tension. The Latham device remains a part of the nut support permanently. The Biach apparatus tensions only one stud at a time and requires special gearing to set the nut since it is completely covered by the apparatus. A similar structure is available commercially but it differs by providing a port for access to the nut. The apparatus disclosed in the H. G. Darrington U.S. Pat. No. 4,015,801 is similar to such commercial device. Each of these devices tensions a single stud at a time. Multiple tensioning is accomplished only by multiple devices having a common pressure fluid manifold.

Such devices would not provide uniform tensioning of bonnet studs in minimum time and would not be a portable apparatus which can be used quickly and effectively on blowout preventers in the field.

SUMMARY

The present invention relates to an improved apparatus for tensioning studs in the bonnets of blowout preventers. Such improved apparatus also provides direct tensioning of the studs and does not rely on the torque-tension relationship which is not a reliable indicator of stress in the stud. The present invention also insures that the tension in opposite studs is uniform and set at the same time.

An object of the present invention is to provide an improved blowout preventer stud tensioner which applies a substantially uniform tension to all studs.

Another object is to provide an improved blowout preventer stud tensioner which provides symmetrical bonnet and stud loading.

A further object is to provide an improved stud tensioner which speeds the tensioning of a plurality of bonnet studs.

Still another object of the present invention is to provide an improved blowout preventer stud tensioner which allows direct access to the nuts on the studs being tensioned.

BRIEF DESCRIPTION OF THE DRAWINGS

The improved stud tensioner of the present invention is shown in two forms in the drawings.

DESCRIPTION OF THE PREFERRED EMBODIMENTS

Figure 1:
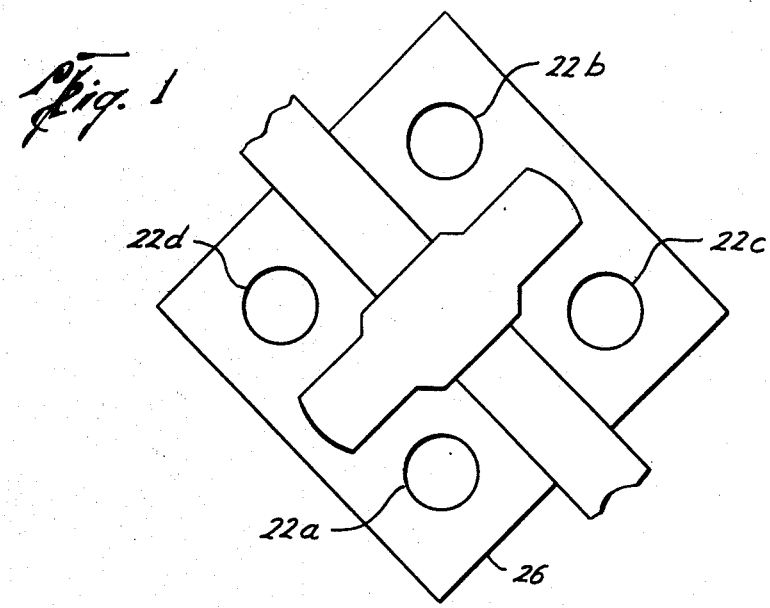
FIG. 1 is an end view of a blowout preventer bonnet.

The improved stud tensioner 10 of the present invention includes, in the form shown in FIG. 1–4, body 12, having a pair of cylinder recesses 14 in communication with passage 16 through body 12. Pistons 18 are positioned within said recesses 14 with suitable seals 19 sealing between pistons 18 and walls of recesses 14 and their piston rods 20 extend from body 12 in parallel relation relative to each other. Cylinder recesses 14 are positioned to allow the outer hollow ends 21 of piston rods 20 to be freely received over opposite studs 22 and nuts 24 to engage bonnet 26 of a blowout preventer.

Figure 2:
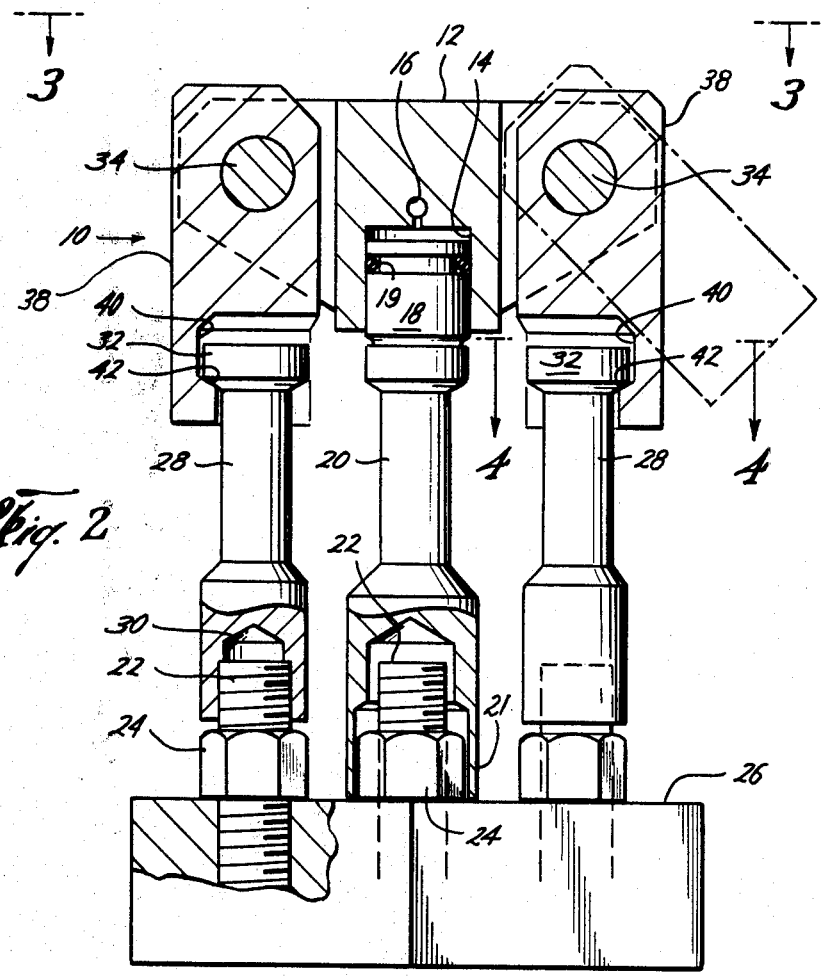
FIG. 2 is a sectional view of the one form of stud tensioner taken along line 2—2 in FIG. 1.

A pair of tension rods 28 are engaged to the other two studs 22 by threaded engagement of their outer internally threaded recesses 30 thereon. With recesses 30 threaded on opposed studs 22, nuts 24 are free to turn and are not obstructed in any way by tensioner 10 as shown in FIG. 2. The outer ends of tension rods 28 are enlarged to form heads 32. Pivot pins 34 extend through ears 36, links 38 and into body 12 to pivotally mount links 38 to body 12. Links 38 each have recess 40 therein which recesses face inward toward each other and have shoulders 42 which engage the under side of heads 32 as shown in FIG. 2. This provides the means on body 12 for engaging the outer ends of the tension rods.

Figure 3:
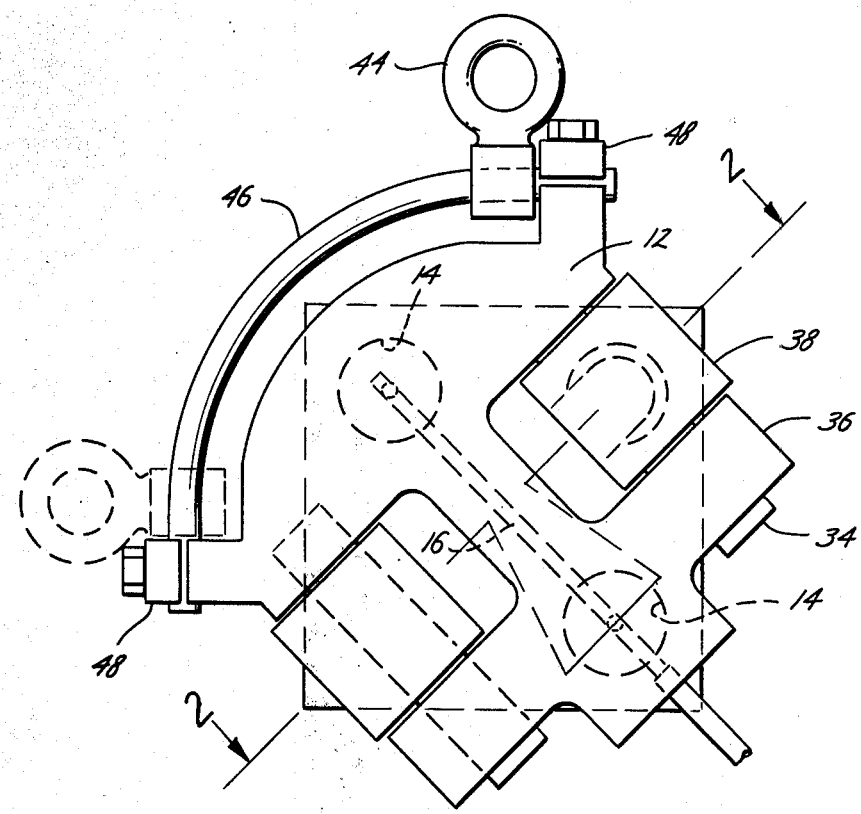
FIG. 3 is an end view of one form of stud tensioner.
Figure 4:
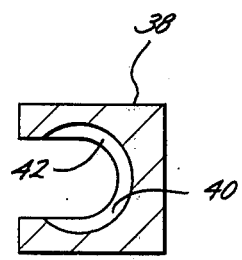
FIG. 4 is a sectional view of the cup engaging the end of the tensioning member taken along line 4—4 in FIG. 2.

Tensioner 10 has a very substantial weight so that it usually is lifted by a hoist or other available lifting means. Lifting lug 44 is mounted on arcuate track 46 which is secured between projections 48 on body 12. As shown in FIG. 3, lug 44 is positioned as shown in solid lines for lifting tensioner 10 in one position and may be moved to the position shown in dashed lines for lifting in another position. For example, piston rods 20 may initially be received over studs 22 a and b and tension rods 28 connected to studs 22c and d. After studs 22c and d have been tensioned, the positions are reversed so that studs 22a and b are tensioned.

With tension rods 28 threaded onto opposite studs 22, links 38 are pivoted outward to the position shown in broken lines in FIG. 2 until tensioner 10 is in position with piston rods 20 on the other opposite studs. Then they are moved into engagement with heads 32. Tension rods 28 should be adjusted so that they are tightly engaged by links 38 with body 12 substantially parallel with the outer surface of bonnet 26. This allows the force exerted by pistons 18 responsive to the introduction of pressure fluid through passage 16 to be applied equally and without side loads on both studs being tensioned. As soon as nuts 24 are tightened on the tensioned studs, the pressure in passage 16 is reduced and tensioner 10 reengaged and repositioned to tension the other two studs.

Figure 5:
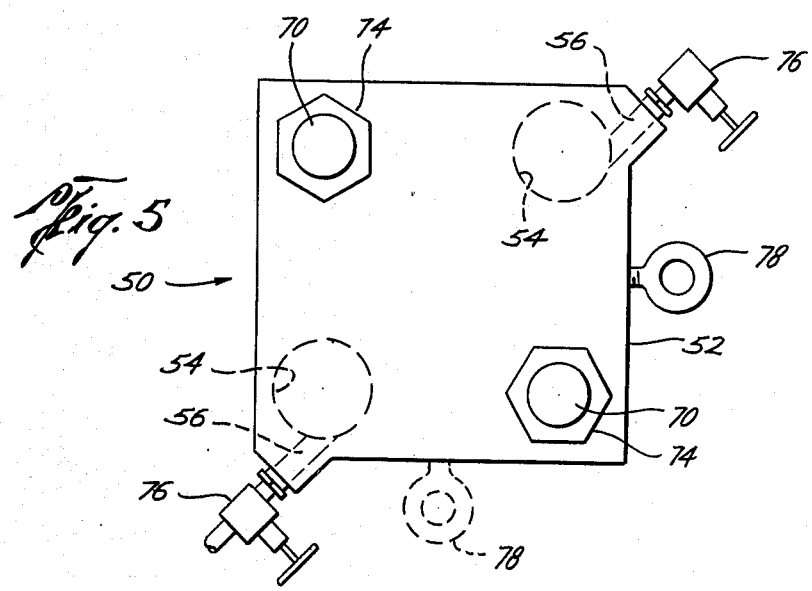
FIG. 5 is an end view of the preferred form of improved stud tensioning of the present invention.
Figure 6:
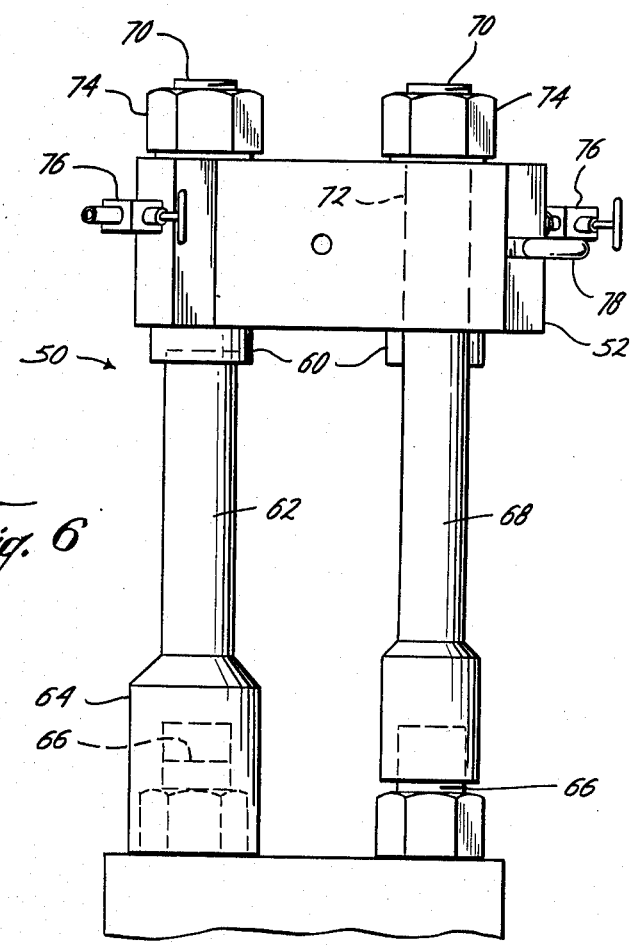
FIG. 6 is a side view of the stud tensioner in FIG. 5.

The preferred and simplified form of the present invention is shown in FIGS. 5 and 6. Tensioner 50 includes body 52 which is generally block-shaped and has cylinder recesses 54 therein with passages 56 in communication with recesses 54. Each recess 54 has a piston 60 therein similar to the piston 18 with piston rods 62 extending to have their enlarged ends 64 over opposite studs 66. Tension rods 68 are threaded on the other opposite studs 66 and have threaded shanks 70 extending through holes 72 through body 52 with nuts 74 tightened on shanks 70 before tensioning. The threaded shanks 70 passing through holes 72 and nuts 74 tightened thereon provide the means on tensioner 50 for engaging tension rods 68.

Liquid under pressure is supplied from a suitable source (not shown) through valves 76, passages 56, to recesses 54. Lifting lugs 78 are secured into the sides of body 52 as shown.

What is claimed is:

1. A stud tensioner for tensioning the studs of a blowout preventer bonnet comprising
    a body having a pair of recesses forming cylinders and a passage communicating with said cylinders,
    a piston positioned within each of said cylinders and having a piston rod,
    the rods of said pistons extending from said body in parallel relationship to each other and having a centering recess in their outer ends adapted to be positioned over two opposite studs and nuts of the bonnet,
    a pair of tension rods having internal threads for threaded engagement with the outer end of bonnet studs on one end of said tension rods,
    an enlarged head on the outer end of each tension rod,
    swinging links, and
    means for pivotally connecting said swinging links to said body,
    said swinging links having a recess adapted to engage the enlarged heads on said tension rods to exert tension thereon whereby application of pressure to said cylinders exerts tension in the tension rods and the studs engaged by the tension rods.

2. A stud tensioner according to claim 1 wherein said pistons and said tension rods are arranged so that opposite studs are tensioned simultaneously.

* * * * *